United States Patent [19]
Loubal

[11] 3,936,667
[45] Feb. 3, 1976

[54] PROCESS AND APPARATUS FOR EVALUATING SUBREGIONS

[76] Inventor: Peter S. Loubal, 700 Grizzly Peak Blvd., Berkeley, Calif. 94708

[22] Filed: Apr. 23, 1974

[21] Appl. No.: 463,394

[52] U.S. Cl............. 235/185; 235/61.6 B; 235/184
[51] Int. Cl.² .................... G06K 11/00; G06F 7/00
[58] Field of Search.. 235/184, 185, 61.6 A, 61.6 B; 340/172.5

[56] References Cited
UNITED STATES PATENTS

| | | | |
|---|---|---|---|
| 2,258,859 | 10/1941 | Mitelman | 235/184 |
| 3,022,501 | 2/1962 | Seigle | 235/61.6 A |
| 3,555,546 | 1/1971 | Bertram | 235/61.6 B |
| 3,618,029 | 11/1971 | Graven | 340/172.5 |
| 3,652,842 | 3/1972 | Lewin | 235/61.6 A |
| 3,694,743 | 9/1972 | Dalke | 235/61.6 B |
| 3,767,899 | 10/1973 | Barter | 235/61.6 A |
| 3,784,789 | 1/1974 | Broek | 235/61.6 A |
| 3,793,506 | 2/1974 | Deschamps et al. | 235/61.6 B |
| 3,803,588 | 4/1974 | LeSchack | 235/61.6 A |

Primary Examiner—Felix D. Gruber
Attorney, Agent, or Firm—Oblon, Fisher, Spivak, McClelland & Maier

[57] ABSTRACT

A method and apparatus are disclosed for simplifying and accelerating the measurement of data values associated with subregions of a district or larger region identified by a map, for example. The method relies upon the concept of chain-wise top ographical ordering of the elements to be analyzed, so that each element, except the first or last, has a unique predecessor in the chain. The apparatus of the present invention includes a digitizer and computer, or a resistive evaluating circuit and a resistance measuring apparatus for summing parameter values associated with selected elements.

14 Claims, 8 Drawing Figures

| SEQ. | ELEMENT NUMBER | PARAMETER VALUE | SUM VALUE | SEQ. | ELEMENT NUMBER | PARAMETER VALUE | SUM VALUE |
|---|---|---|---|---|---|---|---|
|  | 1 | 3 | 3 | V | 24 | 3 | (+)100 |
|  | 2 | 2 | 5 |  | 25 | 4 | 104 |
|  | 3 | 5 | 10 |  | 26 | 2 | (-)106 |
|  | 4 | 7 | 17 | V | 27 | 5 | 111 |
|  | 5 | 4 | (-)21 | V | 28 | 6 | 117 |
| V | 6 | 3 | (+)24 | V | 29 | 9 | 126 |
|  | 7 | 2 | 26 | V | 30 | 3 | 129 |
|  | 8 | 5 | (-)31 | V | 31 | 7 | 136 |
| V | 9 | 7 | 38 | V | 32 | 5 | 141 |
| V | 10 | 4 | 42 | V | 33 | 3 | 144 |
| V | 11 | 2 | 44 | V | 34 | 4 | (+)148 |
| V | 12 | 3 | 47 |  | 35 | 1 | 149 |
| V | 13 | 5 | 52 |  | 36 | 8 | 157 |
| V | 14 | 9 | (+)61 |  | 37 | 6 | (-)163 |
|  | 15 | 1 | 62 | V | 38 | 4 | 167 |
|  | 16 | 1 | 63 | V | 39 | 2 | 169 |
|  | 17 | 6 | 69 | V | 40 | 1 | 170 |
|  | 18 | 3 | 72 | V | 41 | 3 | 173 |
|  | 19 | 5 | (-)77 | V | 42 | 4 | 177 |
| V | 20 | 4 | 81 | V | 43 | 7 | 184 |
| V | 21 | 7 | 88 | V | 44 | 2 | (+)186 |
| V | 22 | 8 | 96 |  | 45 | 1 | 187 |
| V | 23 | 1 | 97 |  |  |  |  |

PROCESS AND APPARATUS FOR EVALUATING SUBREGIONS

BACKGROUND OF THE INVENTION

1. Field of the Invention

This invention relates generally to a method and apparatus for evaluating data and more particularly to a method and apparatus for evaluating data associated with subregions of a larger region or area delineated on a map or otherwise identified.

2. Description of the Prior Art

Problems of evaluating data associated with subregions or districts of a larger region are common to many fields of technology and the social sciences. A typical problem of this type, for example, is involved in administrative redistricting of geographical areas in accordance with census information.

More specifically, an exemplary problem might be the division of a large region such as a city or state into a plurality of political districts. In order to do so, it is necessary to divide the city or state into areas containing approximately equal numbers of voters so that each political representative is elected by essentially the same number of voters. Census information may be used to determine the number of eligible voters in smaller geographical areas, such as city wards, townships, and the like. Thus it would be useful to have an apparatus or system for conveniently mapping out an appropriate geographical area for each political district containing an appropriate number of eligible voters, and for mapping out such an area on the basis of the available census information.

Problems of a similar nature exist in market area analysis, land use evaluation, engineering layout studies, textile design, emergency and diaster planning, natural resource evaluation, physical area measurement and sight location studies, to name a few specific areas. Similar problems exist in many other areas too numerous to mention, as is apparent to those skilled in the art.

Evaluation of problems of this type in the past has been cumbersome and expensive in terms of data preparation, processing time and the cost of needed equipment. For example, it is possible to carry out evaluations of the type discussed with extremely complicated computer programs, or by estimates associated with trial and error techniques. Some sophisticated analytical techniques including the use of on-line query systems, point-polygon methods and procedures based on the connectivity of neighboring elements of networks have recently been applied to the solutions of these problems, but these solutions have failed to appreciably reduce the cost of required data processing equipment required, and similarly have failed to improve the efficiency of the overall approach to the problem of subregion evaluation.

Thus it is believed apparent to those skilled in the art that a new and more efficient method and apparatus for evaluating subregions would be of substantial value in terms of both economic and time savings to those engaged in certain phases of technological and social research and development.

SUMMARY OF THE INVENTION

Accordingly, one object of this invention is to provide a novel method of evaluating subregions.

Another object of this invention is the provision of a novel apparatus for use in the evaluation of subregions.

A still further object of this invention is the provision of a novel method for evaluating subregions of a larger region by indicating only the border of the subregion.

A still further object of the present invention is the provision of a novel method including chain-wise topographical ordering of analyzed elements for simplifying the analysis of combinations of such elements.

A further object of the present invention is the provision of a novel apparatus for carrying out evaluation of data associated with chain-wise topographically oriented elements to be analyzed.

Yet another object of the present invention is the provision of an apparatus for evaluating data associated with individual subregions of a larger region by tracing the borders of the subregions.

Briefly, these and other objects of the present invention are achieved by first topographically ordering in a chain-wise manner a plurality of elemental units to be analyzed. Each elemental unit is identified by a single cross-over point between it and the next element in the chain. The data values associated with each element are determined by analyzing a succession of ordered pairs of cross-over points. Totalization of the values associated with the cross-over points is accomplished in a summation operation. The apparatus of the present invention includes a device for sensing the cross-over points as the borders of particular subregions containing groups of elemental units are traced or otherwise delineated.

BRIEF DESCRIPTION OF THE DRAWINGS

The foregoing and other objects of the present invention will be more fully appreciated as the same becomes better understood by reference to the following detailed description when considered in connection with the accompanying drawings, wherein.

DETAILED DESCRIPTION OF THE PREFERRED EMBODIMENTS

Figures 1, 2:
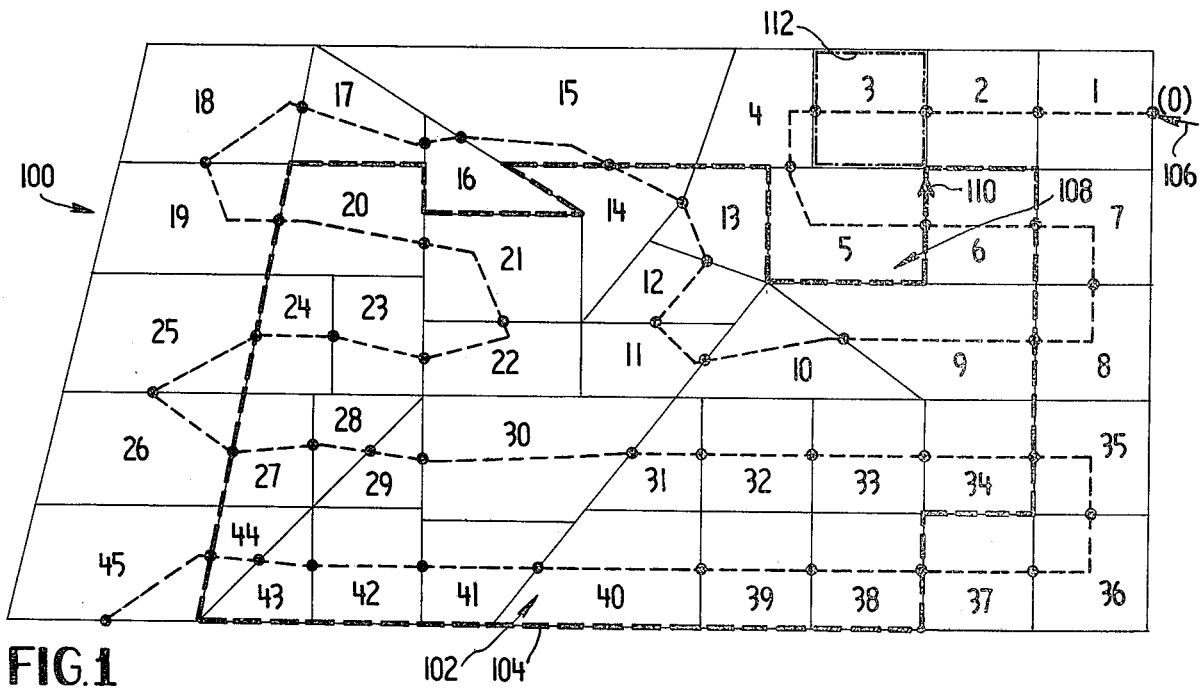
FIG. 1 is a representation of a region divided into elemental units or elements showing a border identifying subregions including a plurality of elements.
FIG. 2 is a table of values associated with each of the elements shown in FIG. 1 for illustrating the method of the present invention.

Referring now to the drawings, wherein like reference numerals designate identical or corresponding parts throughout the several views, and more particularly to FIG. 1 thereof, a representation of a region, designated by the reference numeral 100, is shown.

The region 100 may represent the geographical boundaries of a Country, State, City or other political region, or it may represent a cloth pattern, a factory floor plan, or a mineral deposit. The region 100 may be designated on a conventional paper map, or it may be identified on some type of conventional rigid base, as desired. The specific structural requirements for the designation of the region 100 are quite general, as will be apparent to those skilled in the art from the subsequent disclosure materials.

The region 100 is divided into a plurality of elements numbered 1 – 45. Each of the elements 1 – 45 may be considered a minimum area or unit into which the region 100 is divisible, and each element has a certain parameter value associated with it for identifying a particular characteristic or population of the element. Naturally, many different parameter values may be associated with each element for different purposes.

For example, each element illustrated in FIG. 1 may consist of a census block bordered by streets, and the region 100 may simply be a city map. In this case the parameter values associated with each element are census data, such as the total number of people in each element or census block, the total number of people within certain age groups in each census block, or other types of census data.

A subregion or district 102 within the region 100 is defined by a border 104. The district 102 is an arbitrarily selected area within the region 100 which is to be evaluated in terms of the elements contained within it. The only restriction on the district 102 is that its border 104 does not divide any elements, but falls upon the borders of the individual elements. In other words, the district 102 must contain an integral number of elements. The object of the present invention is to evaluate the contents of the district 102 in terms of the parameters associated with each element. Assuming again that the elements are census blocks, it may be desired for example to evaluate the population within a particular district of a city or the like. In this case, according to the present invention, the district in question is simply circumscribed by a border of the type shown at 104 in FIG. 1. The population in the entire district 102 may then be calculated simply by summing values associated with the elements around the border of the district, so that the need for adding the parameter values associated with all of the elements within the district 102 is eliminated.

A clearer understanding of the method of the present invention will be obtained by reference to the tables in FIG. 2 wherein exemplary values are assigned to each of the elements 1 – 45. More particularly, the tables of FIG. 2 include three separate numerical columns, the left hand column containing the number of each element from 1 – 45, the central column containing a particular numerical or parameter value assigned to each element, and the right hand column containing a running sum of the parameter values in the second column. The parameter value may, for example, indicate the number of people in thousands inhabiting the area defined by each of the elements. Alternatively, the parameter value may represent the area of each element the number of voters in each element, or any other parameter desirable.

The elements are arranged in a chain-wise topographically ordered sequence wherein each element except the first or last has a unique predecessor or successor in the chain. This chain-wise organization is illustrated by a dashed line 106 which passes through each of the elements 1 – 45 only once.

According to one aspect of the invention, the point at which the dashed line 106 passes into or out of each of the elements 1 – 45 if defined as the crossover point. In the present discussion it is assumed that the cross-over point is the point at which the dashed line 106 passes out of each of the elements 1 – 45, although it could equally well be assumed that the cross-over point is the point at which the dashed line 106 enters each of the elements. According to the present invention, the parameter value associated with each of the elements 1 – 45 is considered to be located at the cross-over point of each element. Thus, when a subregion is delineated, as by the border 104, the border 104 passes through a predetermined number of cross-over points, each associated with a particular one of the elements 1 – 45. By evaluating in sequence the parameter values associated with each of the cross-over points along the border 104, the total parameter value of all elements contained within the border 104 may be calculated. Thus, according to the present invention, it is necessary only to evaluate the cross-over points falling on a particular border to evaluate the entire parameter value within the border. This eliminates the need for counting all of the elements within the border and individually summing their associated parameter values. The unique advantages of the method of the present invention will be further explained by means of the following examples.

EXAMPLE 1

Assuming that the region 100 illustrated in FIG. 1 represents the map of a city, and that the elements 1 – 45 each identify individual census blocks. Assume further that the parameter values associated with each element as shown in the tables of FIG. 2, represent the number in thousands of eligible voters within each census block. Under these circumstances let it be further assumed that the district 102 defined by the border 104 is a congressional district. Given these facts, it is desired to calculate the total number of eligible voters within the district 102. The conventional approach to this problem would be to tabulate the parameter values of each of the census blocks contained within the region 102. Since there are 27 census blocks within the region 102, the conventional method would require the addition of 27 different parameter values.

Using the evaluation technique of the present invention, assume that the border 104 begins at a starting point 108, and proceeds upwardly in the direction identified by an arrow 110. The border 104 then first passes through the cross-over point associated with census block number 5. A minus sign is assigned to the sum value of census block number 5 since this is the smallest sum value of all blocks encountered by the border 104. Thus, as shown in FIG. 2 a minus sign is placed next to element number 5. The border 104 then passes through the cross-over point associated with census block 6, and a plus sign is assigned to the sum value associated with census blocks 6 as the next value in sequence, as is denoted by a plus sign in FIG. 2. The border 106 then passes through the cross-over point associated with census block 8, and a minus sign is assigned to the sum value of this census block. Similarly, the border 104 passes through the cross-over points of census blocks 34, 37, 44, 26, 24, 19 and 14, and the sum values associated with each of these blocks are alternately assigned plus and minus signs. The border 104 does not pass through any other cross-over points, thus, according to the present invention, all other cross-over points are irrelevant to the evaluation of the district 102 within the border 104.

Evaluation of the parameters associated with the census blocks is accomplished simply by adding the appropriate sum values as follows:

$$+186 - 163 + 148 - 106 + 100 - 77 + 61 - 31 + 24 - 21 = 121$$

Thus, 121,000 eligible voters are found within the district 102, according to the present invention. It is noted that this calculation involves the summation of only ten values, rather than the 27 required according to conventional techniques. The largest value was placed first above, although it is obvious that the order of summation is irrelevant.

In the above example, it is noted that the enclosed elements are shown in the table of FIG. 2 to lie between positive and negative points marked with a small $v$. It is further noted that the cumulative value obtained above is the same as the absolute value of the sum obtained by starting at a random point on the border 104 annd alternatively adding and subtracting the sum values associated with all encountered cross-over points. It will further be noted that the choice of signs, evaluation directions, etc. is arbitrary, as long as each convention is consistently maintained after it is selected.

EXAMPLE 2

Another example of the method of the present invention is now presented to illustrate that the present method is operative even in the trivial case. Assume it is desired to calculate the parameter value associated with element 3. A border 112 is first drawn around the element 3. The cross-over point of element 2 is first encountered on the border 112, as is the cross-over point of element 3. Referring to the table of FIG. 2 and sequentially assigning minus and plus signs to the relevant sum values, the total sum to be evaluated is:

$$-5 + 10 = 5$$

In other words, the sum value of element 2 minus the sum value of element 3 yields the parameter value associated with element 3, the quantity sought. Although this example is trivial in the sense that the parameter value of element 3 is known before the calculation is undertaken, it is designed to show with further clarity the technique of the present invention. In reality, of course, the method of the present invention achieves greater and greater efficiency as the number of elements within the particular designated subregion becomes larger and larger, as will be apparent to those skilled in the art.

Concerning the signs associated with the individual sum values it is noted that either the sequence numbers of the cross-over points themselves or the sequence of their occurrence along the border (starting from any point) can be used to differentiate between the ends of all sub-chains of elements in a circumscribed subregion. In the first example above, for example, the highest numbered border element was positive, the next highest negative, and so on until the last border element. It is also possible to choose the sign of the first element at random and then alternate signs of the different elements. If the accumulated value turns out to be negative in this case, the sign may simply be reversed since it is known that negative values have no meaning in the particular context chosen.

Figure 3:
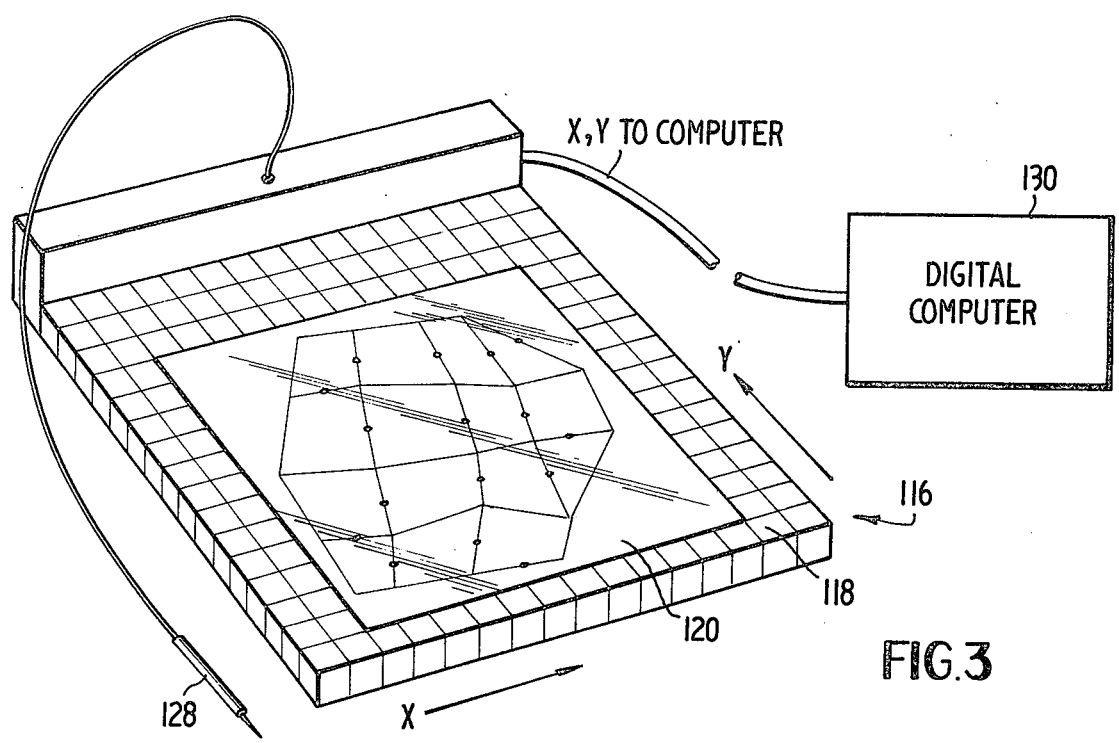
FIG. 3 is a perspective illustration of a digitizer for use with the present invention.

Having thus described the basic method of the present invention, exemplary apparatus for performing the method of the present invention will now be described in detail. Referring particularly to FIG. 3, a conventional digitizer is shown in perspective and is referenced by the numeral 116. The digitizer 116 may, for example, be a conventional Scientific Accessories Corporation model GP-2 digitizer, or a conventional Calmagraphic model CG-I digitizer system. Similarly, substantially any other conventional type of digitizer or digitizer system may be used.

As shown in FIG. 3, the digitizer 116 includes a panel 118 having a grid marked thereon for the purpose of establishing a conventional $x$–$y$ coordinate system. A map 120 is shown placed on the digitizer panel 118. It will of course be understood that the term "map" is meant to include any record or indication of a region, as mentioned previously, usable with the present invention.

Figure 4:
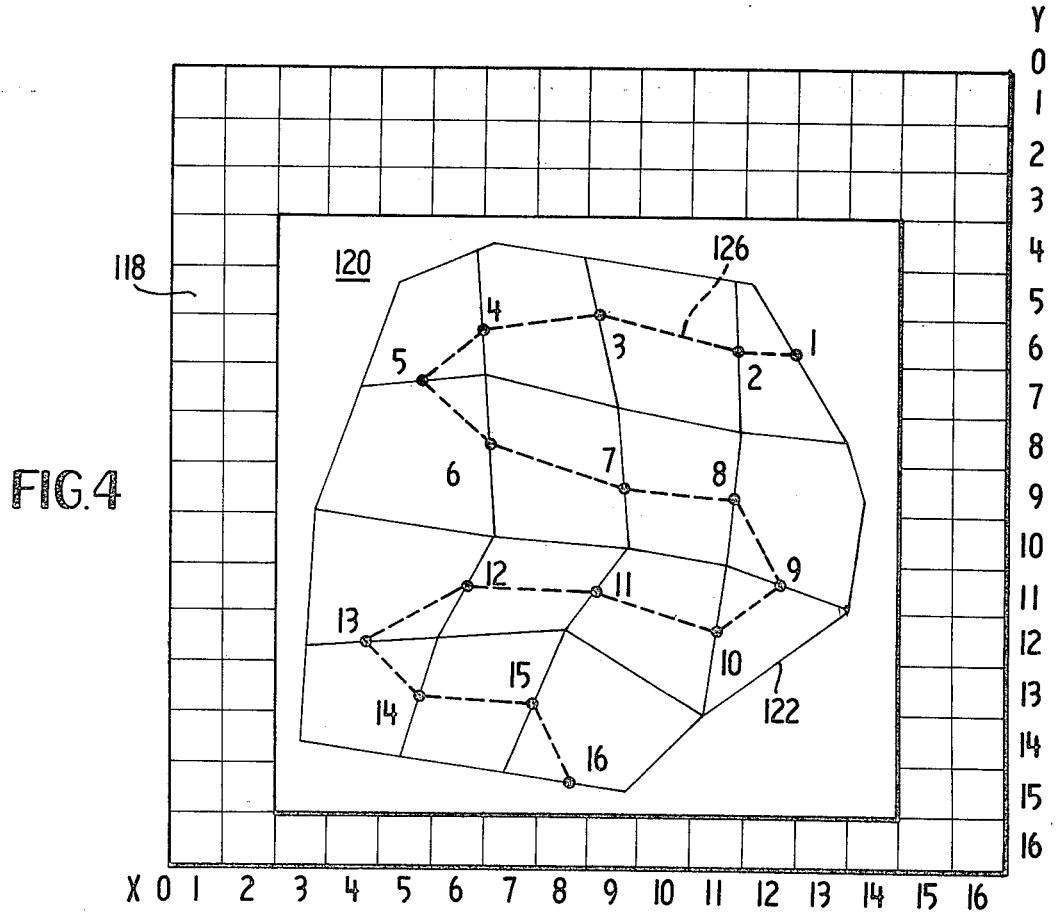
FIG. 4 is a plan view of the digitizer illustrated in FIG. 3 further showing x and y coordinate values.

As shown more clearly in FIG. 4, the map 120 defines a region 122 divided into sixteen consecutively numbered elements (1 – 16). These elements are arranged in a chain-wise typographical order as shown by a dashed line 126. The arrangement of the region 122 is essentially arbitrary, with the exception that the various cross-over points must fall upon the $x$–$y$ coordinates which may be sensed by the digitizer 116.

Referring again to FIG. 3, a conventional digitizer probe 128 is shown coupled to the digitizer 116 for reading out the cross-over points of the region 122. In operation, any selected subregion or district of the region 122 may be evaluated simply by manually touching the series of cross-over points associated with a real or imaginary boundary line defining the particular district or subregion desired to be evaluated. The digitizer 116 then generates output signals representing the coordinates of the points touched by the probe 128, and these coordinates are applied to a suitable conventional computer. Such a computer, for example, may be a conventional IBM model 1620 computer, an IBM model 360 system, or any other conventional, programmable digital computer, as illustrated schematically at 130. The computer includes the stored values necessary to evaluate any subregion within the region 122, as will be explained subsequently. The advantages of the system illustrated in FIGS. 3 and 4 will be apparent from the following example.

EXAMPLE 3

Assume it is desired to define a congressional district containing a specified number of eligible voters. Thus the data set forth in FIGS. 1 and 2 may be assumed applicable. In this case, the map showing the region 100 of FIG. 1 may simply be positioned on the digitizer 116 and an operator may manually move the probe 128 to define a series of different districts. The computer 130 will rapidly evaluate each district thus defined providing an indication of the total number of voters in each district. The operator may then increase or reduce the size of the district until a suitable district is layed out which contains the desired number of voters. It will be clear to those skilled in the art that the redistricting process may be carried out extremely rapidly by utilization of the process and apparatus thus described.

Figure 5:
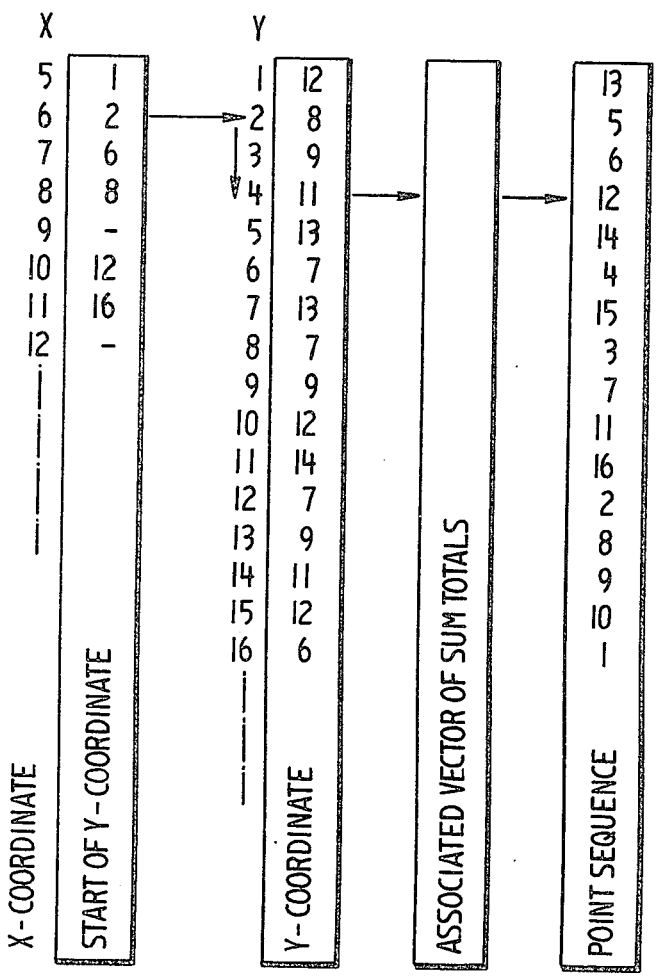
FIG. 5 is a table of values similar to that illustrated in FIG. 2, but referring to the embodiment of the present invention illustrated in FIG. 4.

The programming of the computer 130 will now be described with reference to FIGS. 5 and 6. FIG. 5 illustrates in tabular form exemplary values stored in the computer for the map and point sequence illustrated in FIGS. 3 and 4. The $x$ and $y$ coordinates shown in the table of FIG. 5 are intended to correspond to the $x$ and $y$ coordinates of the various cross-over points illustrated in FIG. 4. For example, in FIG. 4 the cross-over point 12 has the coordinates $x = 6$, $y = 11$.

Figure 6:
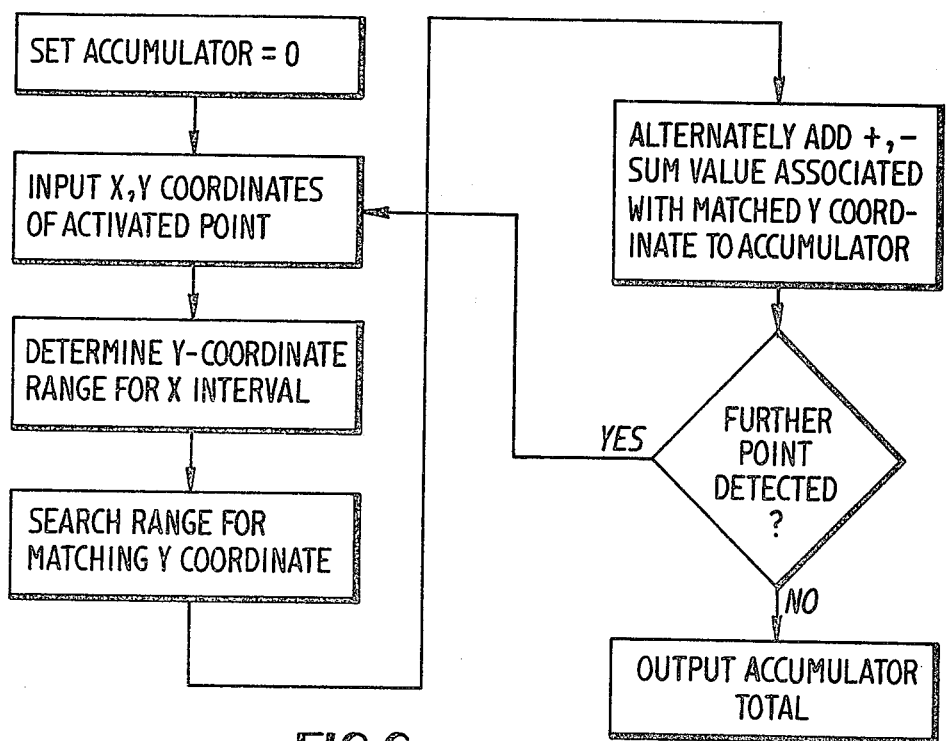
FIG. 6 is a flow chart of a computer program usable for carrying out the evaluation steps according to the method of the present invention.

The flow chart of FIG. 6 indicates the manner in which the computer 130 operates on the data exemplified by the tables of FIG. 5 to carry out the method of the present invention. As shown in FIG. 6, the accumulator of the computer is initially set to 0, after which inputs of $x$ and $y$ coordinates of activated points, that is points touched by the digitizer probe 128, are fed into the computer. A $y$-coordinate range for each $x$ interval is then determined by the computer, after which the computer searches the range for a matching $y$ coordinate. The computer then alternately supplies plus and minus signs to the sum values associated with the matched $y$ coordinate to the accumulator. After this step the computer seeks to determine if any further points are detected. If such further points are detected the computer program is repeated beginning with the input of new $x$ and $y$ coordinates. When no further points are detected the appropriate total output is generated.

The flow chart of FIG. 6 thus represents a computational algorithm or program, wherein each $x$ coordinate points to a vector segment storing the sorted coordinates of the points (if any) within an $x$ coordinate interval. Associated vectors store the desired sum values pertaining to each point. Upon activation of the computer, the pointer of the detected $x$ coordinate and the pointer of the immediately following $x$ coordinate will serve as the limit in a search for the appropriate $y$ coordinate to match the $y$ coordinate detected by the digitizer. This may be accomplished either by a fast binary search, or sequentially. It is pointed out that the memory requirements of the computer, which are greatly reduced by the method of the present invention, may be further substantially reduced by storing only every second $y$ coordinate and inferring the position of the missing $y$ coordinates from their neighbors within the $x$ interval.

In the above described computational process, the sum values associated with each detected point can be used in an immediate process to obtain the desired cumulative value associated with all elements in the region 122 by means of the alternate addition and subtraction of values in an accumulator, as shown in the flow chart of FIG. 6. The absolute value stored in the accumulator at the end of the computational process provides the desired total. In a variation of this technique, the sum values of identified points may be stored, sorted and then scanned from the highest to the lowest value, and these values can be alternately added and subtracted and supplied to an accumulator which will store the correct total at the end of the process.

A simple FORTRAN (TM) program for carrying out the above-described computational process is set forth below:

PROGRAM

```
1. READ X,Y
   IF (X . EQ.0) GO TO 4
   A = 0
   K = 1
   I = S (X)
2. IF (C (Y) . EQ. Y) GO TO 3
   I = I+1
   GO TO 2
```

-continued
PROGRAM

```
3. A = A + K* T (I)
   K = -K
   GO TO 1
4. A = ABS (A)
   WRITE A
```

The operation of this program will be clearly apparent to those skilled in the art, and will be further apparent to those skilled in the art that many modifications and variations of this program are possible within the scope of the teachings of the present invention.

Figure 7:
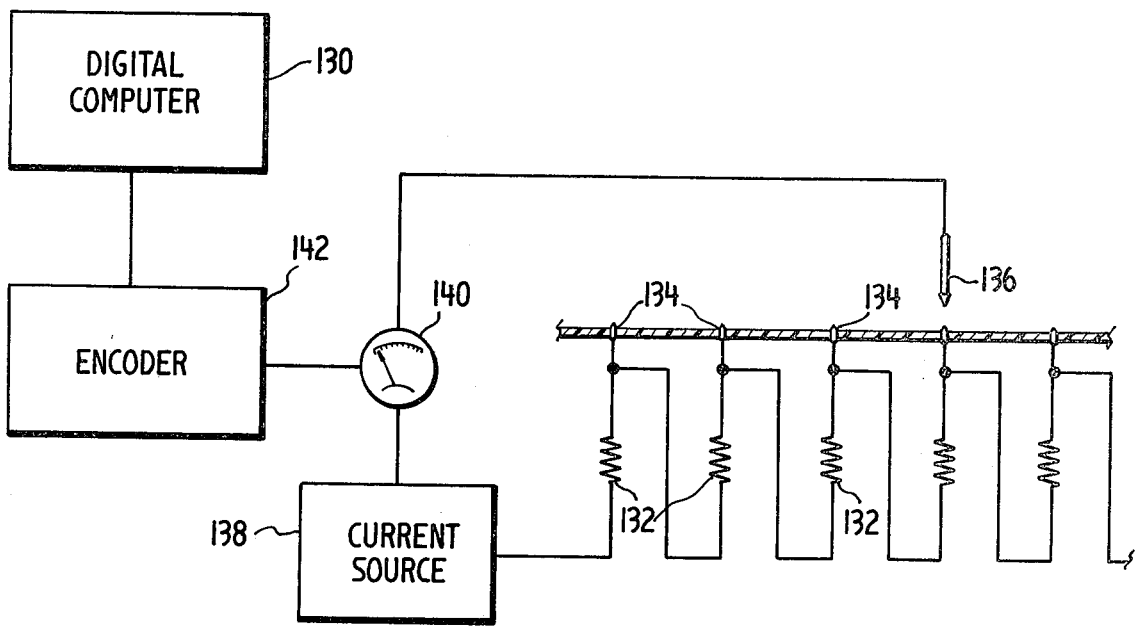
FIG. 7 is a schematic diagram of a resistive evaluating circuit according to another embodiment of the present invention.

The apparatus described above relies upon the use of a conventional general purpose digitizer. However, many varieties of special purpose devices can be constructed to permit the performance of the present invention. Such an apparatus is schematically illustrated in FIG. 7. This apparatus includes a chain of electrical resistors, each having a selected unit value corresponding to a predetermined parameter value. Each resistor has a contact point 134 coupled to it which is suitable for engagement by a probe 136. Since each of the resistors illustrated in FIG. 7 has a resistance value corresponding to the individual parameter values (illustrated in the third column in FIG. 2, for example) and since the resistors are coupled in series, the voltage between the contact points 34 corresponds to the sum values illustrated in the fourth and eighth columns of the table in FIG. 2. A constant current source 138 is coupled to the resistor chain to supply power thereto. An accurate meter 140, which may be an ohm meter, for example, is coupled between the probe 136 and the constant current source 138 to provide a measure of the total resistance coupled between the current source and the probe as each of the contact points 134 is engaged. A conventional analogue to digital converter or encoder 142 is coupled to the meter 142 to convert the output of the meter into digital form to be supplied to digital computer 130.

The circuit shown in FIG. 7 may be constructed with a large number of resistors connected in a chain which is then shaped into a matrix shape such that the contact points 134 form a grid of points appearing in a regular order. A conventional map may then be pressed down over the contact points 134, such that the contact points penetrate the map in a predetermined pattern. The map may then be analyzed according to the process of the present invention by using the probe 136 to designate selected subregions or districts.

Using the circuit of FIG. 7, as described above, the meter 140 provides output value corresponding to the sequence of contact points engaged by the probe 136. The meter values are encoded by the encoder 142 and transmitted to the computer 130 for processing as described above. In particular, the sum value associated with each of the engaged contact points is initially stored in the computer memory and will be used by the computer to calculate the desired output total. Thus only the final step in the computational algorithum illustrated in the flow chart of FIG. 6 is necessary when the apparatus illustrated in FIG. 7 is used.

The apparatus of FIG. 7 can be further modified by selecting the values of the individual electrical resistors 132 as proportional to the parameter values of the individual elements represented by each resistor. In this case, the output of the meter 140 will indicate the parameter sum value associated with each element directly, i.e. the value indicated in the right hand column of the table of FIG. 2. These values can then be alternately added and subtracted from one another to provide the desired output total. The addition and subtraction can be carried out by a sophisticated computer of the type described above, or by an extremely simplified adding and subtracting device. Alternatively, the readings of the meter 140 can simply be read out manually, and the manually observed values can be entered into a conventional, manually operated adding machine for manual tabulation. Thus an operator may easily calculate total parameter values for a selected subregion using the thus modified circuit of FIG. 7 in cooperation with a conventional adding machine.

Figure 8:
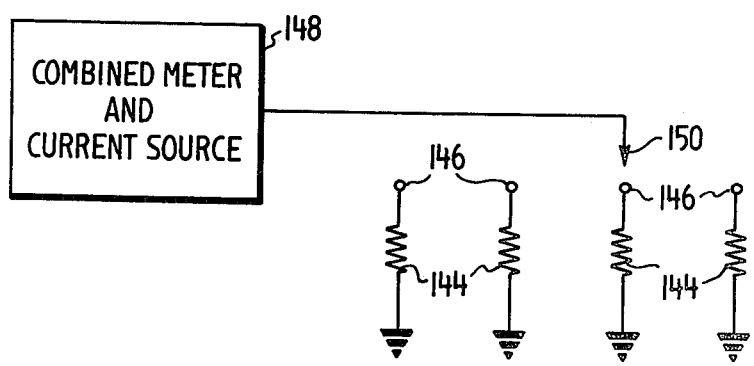
FIG. 8 is a schematic diagram of another resistive evaluating circuit according to the apparatus of the present invention.

A further embodiment of the present invention is illustrated in FIG. 8 wherein a chain-wise connection of resistors is not required. In this case, a plurality of grounded resistors 144 are simply arranged in a matrix of the of contact points 146 coupled to each of the resistors. In this case, the value of each resistor is selected to be proportional to the running sum value listed in the right hand column of the table of FIG. 2, for example. A conventional combined meter and current source 148 having a conventional probe 150 can then be used to provide a measurement of the desired output values. In particular, simply by engaging the probe 150 with each of the contact points 146, the meter 148 will provide an output corresponding to the cumulative sum value of the point contacted. These values may simply be manually added to and subtracted from one another to provide the desired evaluation of a selected district. Using this embodiment of the present invention, a permanent map of a city or other district may be easily constructed having resistors representing the predetermined parameter sum values permanently mounted therein. An operator may then easily conduct evaluations of differeing districts or regions of the map simply by contacting the probe 150 with a series of the contact points 146 defining the desired district, and manually adding and subtracting the output values registered by the meter 148. Additionally, the resistors 144 may be made adjustable so that the parameter values can be changed with ease.

It will be apparent to those skilled in the art that many additional alternative structures can easily be constructed to perform the method of the present invention in view of the present teachings. For example, a perforated map may be constructed in which the contact points and parameter values are represented by electrical, optical, acoustical and pressure responsive devices to provide the desired output totals. Furthermore, it will be apparent that the present invention is not limited to use with a map, or with a paper representation of a region, but may be used in conjunction with any other suitable representation of a region or district. It will also be evident that the present method and apparatus may be used for evaluating elements of a chain which do not represent subareas. For example, the elements could be intersections on a highway map and the device used to trace a path whose length is to be evaluated.

Obviously, many additional modifications and variations of the present invention are possible in light of the teachings set forth above. It is therefore to be understood that within the scope of the appended claims, the invention may be practiced otherwise than as specifically described herein.

What is claimed as new and desired to be secured by Letters Patent of the United States is:

1. A method of analysing a subregion of a region divided into elemental areas wherein each elemental area has a predetermined parameter value associated with it and is surrounded by a boundary, comprising the steps of:
   arranging said elemental areas in a chain-wise topographical order,
   preparing a table containing the sums of said parameter values associated with said arranged elemental areas to provide a running sum value for association with each elemental area,
   selecting a cross-over point on said boundary of each said elemental area,
   physically establishing a border within said region to define said subregion, said border surrounding an integral number of said elemental areas; and,
   alternately adding and subtracting said running sum values for each elemental area having a cross-over point which falls on said border,
   whereby the total parameter value of all elemental areas within said subregion is determined.

2. A method as in claim 1, wherein said step of arranging includes the step of:
   tracing a continuous path through said region which traverses each of said elemental areas only once.

3. A method as in claim 2, wherein said step of selecting includes the step of:
   choosing as a cross-over point one point at which said continuous path meets said boundary of each elemental area.

4. A method as in claim 1, wherein said step of establishing includes the step of:
   marking a physical border on a physical representation of said region.

5. A method as in claim 1, further comprising the step of:
   taking the absolute value of the term resulting from said step of alternately adding and subtracting.

6. An apparatus for analysing a subregion of a region divided into elemental areas wherein each elemental area has a predetermined parameter value associated with it and wherein each parameter value is associated with a selected cross-over point of each said elemental area, comprising:
   arranging means for arranging said elemental areas in a chain-wise topographical order,
   electrical contact means coupled to said arranging means and located at said selected points for providing electrical signals related to said predetermined parameter values of said elemental areas,
   electrical probe means for engaging said electrical contact means and for carrying said electrical signals; and,
   signal processing means coupled to probe means for sensing said electrical signals and for permitting a total parameter value of said subregion to be determined.

7. An apparatus as in claim 6, wherein said arranging means comprises:
   a physical representation of said region.

8. An apparatus as in claim 6, wherein said arranging means includes:
   a printed document having said region and said elemental areas designated thereon.

9. An apparatus as in claim 6, further comprising:

a network of impedance means each said means having impedance values related to said parameter values coupled to said electrical contact means; and, said signal processing means includes measuring means for detecting said impedance values.

10. An apparatus as in claim 9, wherein:

said network of impedance means includes a network of series connected resistors, each of said resistors having a resistance value equal to a parameter value associated with a particular elemental area; and, further comprising encoding means coupled to said measuring means for converting output signals thereof to digital form.

11. An apparatus as in claim 9, wherein said network of impedance means includes a matrix of grounded resistors, each having a resistance value equal to a selected parameter sum value.

12. An apparatus for analysing a plurality of data elements, each of which has a predetermined parameter value associated with it comprising:

means for arranging said elements in a chain-wise topographical order, identifying means on which said arranging means is positioned for providing output signals identifying said data elements, probe means cooperating with said identifying means for engaging said data element for activating said identifying means to generate output signals identifying said engaged data elements, signal processing means coupled to said identifying means for receiving said identifying output signals and for associating a parameter value with each.

13. An apparatus as in claim 12, wherein:

said signal processing means includes summing means for summing said parameter values.

14. An apparatus as in claim 13 wherein said identifying means comprises:

digitizer means for generating an output signal identifying coordinates of points engaged by said probe means.

* * * * *